Figure 2:
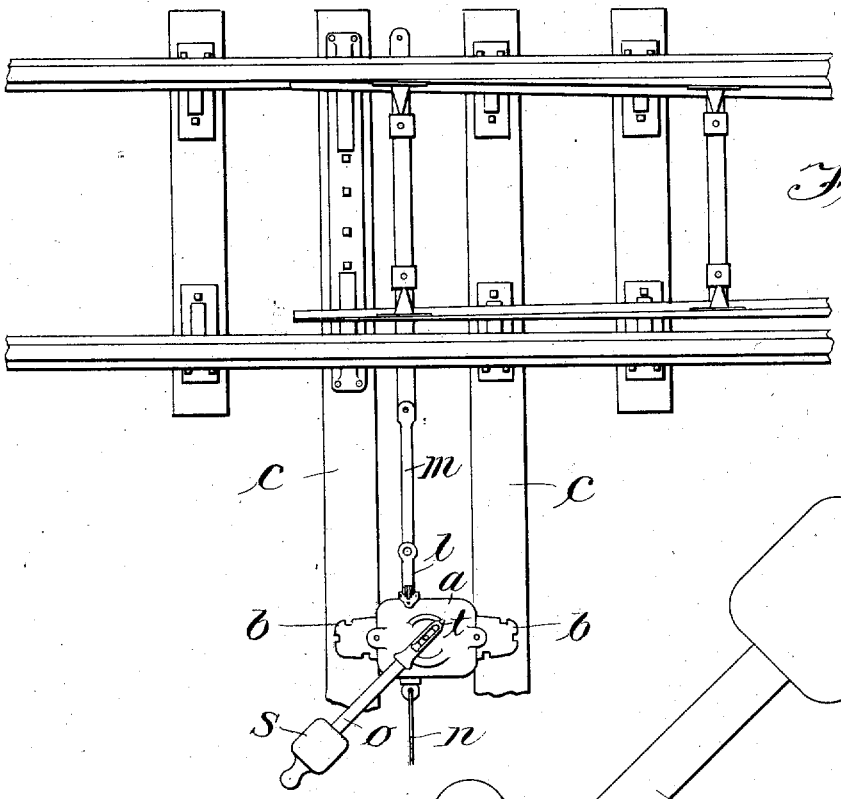

No. 12,216. REISSUED MAY 3, 1904.

G. L. MANSFIELD.

SWITCHING MECHANISM.

APPLICATION FILED NOV. 24, 1903.

2 SHEETS—SHEET 1.

Witnesses:
H. S. Gaither.
E. K. Jarecki.

Inventor:
George L. Mansfield
by Lambert & Wickersham
Attorneys

No. 12,216. REISSUED MAY 3, 1904.

G. L. MANSFIELD.

SWITCHING MECHANISM.

APPLICATION FILED NOV. 24, 1903.

2 SHEETS—SHEET 2.

Witnesses:
H. S. Gaither
E. K. Jarecki.

Inventor:
George L. Mansfield
by Chandlee & Wilkinson
attorneys

No. 12,216. Reissued May 3, 1904.

UNITED STATES PATENT OFFICE.

GEORGE L. MANSFIELD, OF CHICAGO, ILLINOIS.

SWITCHING MECHANISM.

SPECIFICATION forming part of Reissued Letters Patent No. 12,216, dated May 3, 1904.

Original No. 695,467, dated March 18, 1902. Application for reissue filed November 24, 1903. Serial No. 182,557.

*To all whom it may concern:*

Be it known that I, GEORGE L. MANSFIELD, a citizen of the United States, residing at Chicago, in the county of Cook and State of Illinois, have invented a certain new and useful Improvement in Switching Mechanism, of which the following is a full, clear, concise, and exact description, reference being had to the accompanying drawings, forming a part of this specification.

My invention relates to switching mechanism, and has for its object the simplication of such mechanism and to insure effective operation thereof.

One feature of the invention consists in the provision of an actuating-bar confined to substantially a straight-line movement and having a gearless connection with the operating-shaft. Heretofore in order to cause a straight-line movement of this actuating-bar gearing was employed in the form of a pinion moved by the shaft engaging a rack carried by the actuating-bar.

In accordance with my invention I preferably fix a crank-arm upon the operating-shaft that has sliding connection with the actuating-bar. Either the arm or the bar may be provided with a pin, the other one of these members being provided with a corresponding slot, in which the pin is adapted to move back and forth. The arm is preferably provided with a slot, while the actuating-bar carries the pin. The operating-shaft is provided with an actuating-arm to be grasped by the switchman to effect the rotation of the shaft in a corresponding operation of the actuating-bar to move the switch-points from one position to another.

The switch-operating mechanism of my invention is particularly well adapted to a two-throw construction, although I do not wish to be limited to the number of adjustments that the switch mechanism may be adapted to effect. The actuating-arm preferably has a pivotal connection with the operating-shaft, the axis of this connection preferably being horizontal, so that the actuating-arm may be inclined at various angles as it is being operated.

In order that the switch-operating mechanism may be insured definite operating positions, I provide mechanical obstructing means, preferably a lug, that will force the switch-operating mechanism to maintain and preferably to assume one of these operating positions, if such position has not been previously effected by manual adjustment. This obstructing device is preferably a stationary cam in the form of an inverted V, upon which the actuating-arm is adapted to ride. Through the agency of this cam the switchman is only required to shift and elevate the actuating-arm sufficiently to have it reach the apex of the cam, whereafter the actuating-arm may fall the rest of the way, this arrangement being that preferably employed in connection with the two-throw switch. For this purpose the arm is preferably weighted to insure its descent. The switch mechanism is thus in its preferred embodiment a semi-automatically-operated apparatus when attended to by a switchman. It is adapted to be operated in a completely automatic manner by the track-vehicle, as a locomotive, passing a switch improperly adjusted, the wheels of the vehicle engaging the switch-points and by means of the tie-bar and actuating-bar forcing the weighted switch-arm to its proper position to enable the following vehicle-wheels to pass the switch, which is thus not liable to be thrown out of an adjustment during the passage of the train. The actuating-bar and the tie-bar are preferably separately formed for structural reasons; but I do not wish to be limited to this arrangement.

In order to prevent the actuating-arm from being elevated too far above the engaging cam, the said arm is preferably elongated beyond the other side of the pivot to constitute a nose that engages another V-shaped cam inversely placed with respect to the first aforesaid cam. The nose by engaging the walls of the added cam prevents the elevation of the arm a material distance above the inverted-V cam. It will be understood that this cam mechanism is the preferred means employed for forcing the actuating-arm to assume any position of adjustment; but it is obvious that other mechanical devices may be employed that will accomplish the same purpose, though I prefer the particular cam mechanism specified, as added functions in the operation of the mechanism may be secured thereby.

I have thus generally described the preferred embodiment of my invention and the individual characteristics of such embodiment; but I have not attempted to indicate all of the features and character of my invention. The scope of the invention will be pointed out in connection with the appended claims.

The switch-operating mechanism may also be employed to effect the simultaneous switching of a semaphore-signal from one position or condition of use to another.

I will explain my invention more fully by reference to the accompanying drawings, in which—

Figure 1:
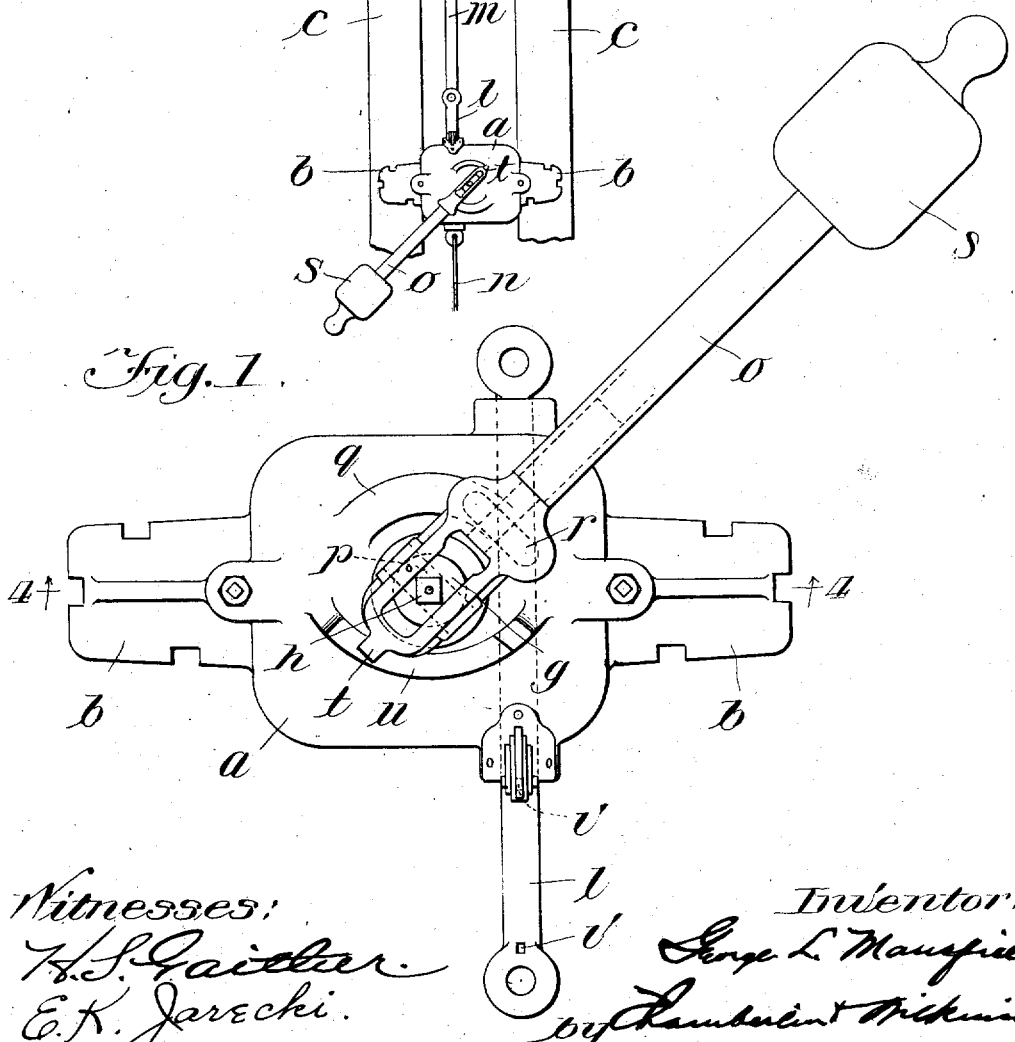
Figure 3:
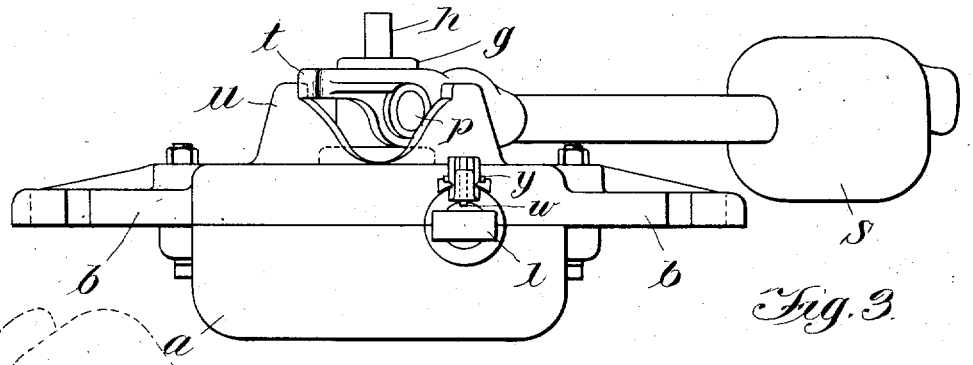
Figure 6:
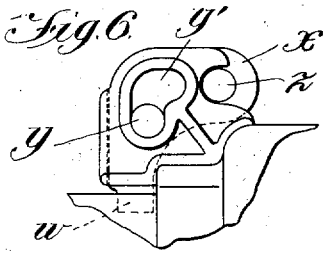
Figure 4:
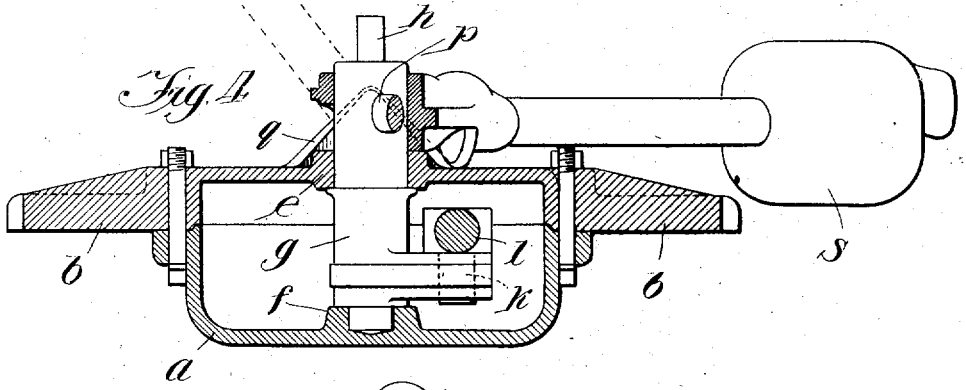
Figure 5:
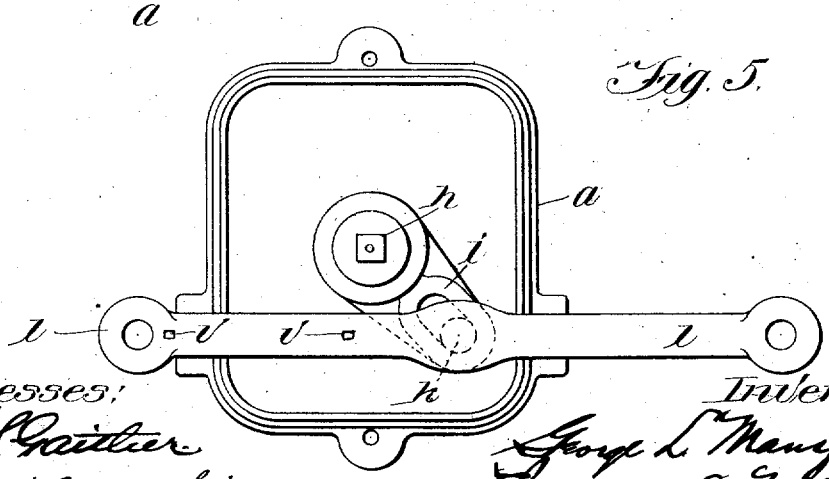

Figure 1 is a plan view of a switch-stand constructed in accordance with my invention. Fig. 2 is a similar view illustrating its association with a switch. Fig. 3 is a side view of the stand shown in Fig. 1. Fig. 4 is a sectional view on line 4 4 of Fig. 1. Fig. 5 is a view similar to Fig. 1, the cover being removed; and Fig. 6 is a detail view of the lock.

Like parts are indicated by similar characters of reference throughout the figures.

It will be understood that in the drawings I have illustrated but one of many embodiments of various features of my invention, the embodiment illustrated being preferred.

The entire structure is termed technically a "switch-stand." The stand proper preferably comprises a casing or chamber *a* for containing certain operating parts, to be hereinafter set forth, having ears *b b* projecting therefrom, which may be fastened in place upon sleepers or tie extensions *c c*. The casing *a* is divided horizontally into two parts—a base portion and a cap portion—and it is to the cap portion that the ears *b b* are preferably secured, so that the bottom portion may be accommodated between the ties. There is journaled in the bearings *e* and *f*, provided in the cap and base portions of the stand, an operating-shaft *g*, which is preferably vertically disposed and is provided with a socketed extension *h*, into which a visual signal may be fitted to indicate the adjustment of the switch. This operating-shaft has rigidly secured thereto a crank-arm *i*, that is disposed inside of the casing, this crank-arm being slotted to receive a pin *k*, carried by the actuating-bar *l*, which actuating-bar may be provided at one end with an aperture for pivotal connection with the tie-bar *m* and at the other end for pivotal connection with a semaphore-rod *n*. The actuating-bar, as heretofore stated, is preferably formed separately from the tie-bar, this tie-bar, as is well understood, being connected with both switch-points, so that when the actuating-bar is moved the switch will be thrown from one position to another. The actuating-bar is preferably confined to a straight-line travel and is preferably made circular in cross-section to form a close fit with the openings in the switch-stand chamber *a* to exclude moisture, &c., from the interior of the chamber. To further exclude foreign matter, the top and bottom portions of the switch-stand chamber are provided with offset shoulders forming a matched joint. The operating-shaft may be rotated in a horizontal plane, causing a corresponding rotation of the crank-arm and a consequent straight-line travel of the actuating-bar, the pin *k* traveling back and forth in the slot provided in the crank-arm to permit the pin and crank-arm to accommodate themselves to their varying positions. The objectionable pinion and rack-bar are thus obviated by the preferred embodiment of one feature of my invention.

The other feature of my invention consists in the operation of the actuating-bar by means of improved mechanism, securing effective adjustment of the actuating-bar. To this end there is provided an actuating-arm *o*, that is united with the operating-shaft, preferably by means of a pivotal bolt *p*, that occupies a horizontal plane, whereby a swinging connection is afforded between the actuating-arm and the operating or rotating shaft. The pivoted end of the actuating-arm is provided with a recess that is preferably sufficiently long to permit the elevation of the arm forty-five degrees with respect to the horizontal, while the actuating-bar, crank-arm, and operating-shaft are so disposed and proportioned as to require a rotation of the operating-shaft through about ninety degrees to effect the adjustment of the actuating-bar in either of its alternative positions.

To prevent the switching apparatus from occupying any but either of its operative positions, I employ a mechanical obstruction, such as a projection or lug *q*, preferably in the form of a cam. This cam *q* is preferably in the form of an inverted V, whose apex is located about forty-five degrees from either of the alternative positions of the switching apparatus. For the purpose of enabling the actuating-arm to ride upon the cam, I preferably provide a cam-roller *r*, although this is not essential to the apparatus. The arm either directly or indirectly rides upon the cam. When the apparatus is to be manually operated, the actuating-arm is grasped and moved from the base of the cam toward its apex, whereafter gravity may be effective in completing the travel of the arm, it requiring a movement of the arm from one side of the cam to the other to effect a complete adjustment of the switch from one of its operating positions to the other where a two-throw switch is being operated. To aid the actuating-arm in its descent from the apex of the cam to the base, the arm may be weighted, I having indicated for this purpose an added weight *s*, which, however, is not sufficiently great to prevent the switch-operating mechanism from being actuated automatically by a passing locomotive, occasion requiring. To prevent an undue elevation of the actuating-arm, and consequently too great a shock when the switch-arm is allowed to fall from an elevated position, I provide a nose *t* upon the switch-arm, the pivot-pin *p* being located between the nose and the roller *r*. This nose engages the converging cam-surfaces of the V-shaped cam *u*, inversely located with respect to the cam or vertically-projecting lug or mechanical obstruction *q*, the nose *t* and the cam *u* coöperating to prevent t elevation of the arm or cam-roller *r* an aterial distance above the cam *q*, as the cams *q* and *u* are diametrically opposite.

If it is desired to lock the actuating-bar in either of its alternative positions, it may be notched to form recesses *v v*, with either of which recesses, according to the adjustment of the actuating-bar, the nose *w*, provided upon a locking-bar *x*, may engage, this locking-bar being provided with a pin *y*, the said locking-bar and said pin being suitably mounted in guideways provided upon the cap-plate of the switch-stand. The pin *y* is adapted to move in a groove *y'*, provided in the supporting-plate of the locking mechanism, the locking-bar being provided with a hole *z*, which locking-bar is adapted to be held in place when the pivoted hasp of a padlock is inserted through this hole *z*. The lock is not so strong, however, but what a locomotive in passing an improperly-adjusted switch may force it.

It will be seen that in the preferred form of the invention I provide a switch-stand wherein the actuating-arm is provided with means for guiding it in its movement in an upward, lateral, and downward direction. While the movement of the arm is preferably guided in a fixed path both in its manual and automatic operations, I do not wish to be limited in all embodiments of the invention to such a construction.

While I speak of an actuating-bar in the claims, I do not wish to be limited to a bar that is separately formed from the elements it actuates. In the claims I use the term "actuating-bar" in the sense of that portion of the switch-operating mechanism to which the part that is to be switched is connected. The term "actuating-arm" is used in the claims to designate the arm that is operated by the hand to effect the adjustment of the actuating-bar. It is for the purpose of limiting this hand-operated actuating-arm to one or the other of its operative positions that a mechanical obstruction or cam specified in some of the claims is employed.

The switch-operating mechanism of my invention I believe to be broadly new, and I do not, therefore, wish to be limited to the precise disclosure thereof herein shown and particularly described; but,

Having thus described my invention, I claim as new and desire to secure by Letters Patent—

1. In a switch-operating mechanism, the combination with an operating-shaft, of an actuating-bar connected therewith, an actuating-arm engaged to the operating-shaft, and means for guiding the actuating-arm in an upward, lateral, and downward direction.

2. In a switch-operating mechanism, the combination with an operating-shaft, of an actuating-bar connected therewith, an actuating-arm pivotally connected with the operating-shaft, and means for guiding the actuating-arm in an upward, lateral, and downward direction.

3. In a switch-operating mechanism, the combination with an operating-shaft, of an actuating-bar connected therewith, an actuating-arm pivotally connected with the operating-shaft, and means for guiding the actuating-arm in an upward, lateral, and downward direction during the movement of the operating-shaft.

4. In a switch-operating mechanism, the combination with a vertical operating-shaft, of an actuating-bar connected therewith, an actuating-arm pivotally connected with the operating-shaft and adapted to revolve the same in a horizontal plane, and means for guiding the actuating-arm in an upward, lateral, and downward direction.

5. In a switch-operating mechanism, the combination with a vertical operating-shaft, of an actuating-bar connected therewith, an actuating-arm pivoted to the operating-shaft and adapted to revolve the same in a horizontal plane, and a stationary cam adapted to guide the actuating-arm in an upward, lateral, and downward direction.

6. In a switch-operating mechanism, the combination with an actuating-bar, of an actuating-arm for operating the same, and a stationary cam retaining the actuating-arm with the actuating-bar in an operative position.

7. In a switch-operating mechanism, the combination with an actuating-bar, of an actuating-arm, and a cam in the form of an inverted V located between operative positions of the arm to limit the arm, according to its adjustment, to one of such positions.

8. In a switch-operating mechanism, the combination with an actuating-bar, of an actuating-arm, and a V-cam located between operative positions of the arm to retain the arm, according to its adjustment, in one of such positions.

9. In a switch-operating mechanism, the combination with an actuating-bar, of an actuating-arm for operating the same, and a vertical lug interposed between operative positions of the arm for causing the actuating-arm, with the actuating-bar, to retain an operative position and to force vertical movement of the arm when moving the actuating-bar.

10. In a switch-operating mechanism, the combination with an actuating-bar, of an actuating-arm for operating the same, a rotating shaft having engagement with the actuating-arm and actuating-bar, and a vertical lug interposed between operative positions of the actuating-arm for causing the actuating-arm with the actuating-bar to retain an operative position and to force vertical movement of the arm when moving the actuating-bar.

11. In a switch-operating mechanism, the combination with an actuating-bar, of an actuating-arm for operating the same, a rotating shaft having engagement with the actuating-arm and actuating-bar, and a cam for causing the actuating-arm with the actuating-bar to retain an operative position.

12. In a switch-operating mechanism, the combination with an actuating-bar, of an actuating-arm, a rotating shaft having engagement with the actuating-arm and actuating-bar, and a V-cam located between operative positions of the arm to retain the arm, according to its adjustment, in one of such positions.

13. In a switch-operating mechanism, the combination with an actuating-bar, of an actuating-arm for operating the same, a rotating shaft, a crank-arm secured to the rotating shaft and having connection with the actuating-bar, and a vertical lug interposed between operative positions of the actuating-arm for causing the actuating-arm with the actuating-bar to retain an operative position and to force vertical movement of the arm when moving the actuating-bar.

14. In a switch-operating mechanism, the combination with an actuating-bar, of an actuating-arm for operating the same, a rotating shaft, a crank-arm secured to the rotating shaft and having connection with the actuating-bar, and a cam for causing the actuating-arm with the actuating-bar to retain an operative position.

15. In a switch-operating mechanism, the combination with an actuating-bar, of an actuating-arm, a rotating shaft, a crank-arm secured to the rotating shaft and having connection with the actuating-bar, and a cam in the form of an inverted V located between operative positions of the actuating-arm to limit the actuating-arm, according to its adjustment, to one of such positions.

16. In a switch-operating mechanism, the combination with an actuating-bar, of an actuating-arm, a rotating shaft, a crank-arm secured to the rotating shaft and having connection with the actuating-bar, and a V-cam located between operative positions of the actuating-arm to retain the actuating-arm, according to its adjustment, in one of such positions.

17. In a switch-operating mechanism, the combination with an actuating-bar, of an actuating-arm for operating the same, a rotating shaft, a crank-arm secured to the rotating shaft and having connection with the actuating-bar, and a vertical mechanical obstruction interposed between operative positions of the actuating-arm for causing the actuating-arm with the actuating-bar to retain an operative position and to force vertical movement of the arm when moving the actuating-bar.

18. In a switch-operating mechanism, the combination with an actuating-bar, of an actuating-arm for operating the same, a rotating shaft, a crank-arm secured to the rotating shaft and having sliding connection with the actuating-bar, a vertical lug interposed between operative positions of the actuating-arm for causing the actuating-arm with the actuating-bar to retain an operative position and to force vertical movement of the arm when moving the actuating-bar, and means for confining the actuating-bar to substantially a straight-line travel.

19. In a switch-operating mechanism, the combination with an actuating-bar, of an actuating-arm for operating the same, a rotating shaft, a crank-arm secured to the rotating shaft and having sliding connection with the actuating-bar, a cam interposed between operative positions of the actuating-arm for causing the actuating-arm with the actuating-bar to retain an operative position, and means for confining the actuating-bar to substantially a straight-line travel.

20. In a switch-operating mechanism, the combination with an actuating-bar, of an actuating-arm having a mounting that is stationary in location, a rotating shaft, a crank-arm secured to the rotating shaft and having sliding connection with the actuating-bar, a cam in the form of an inverted V located between operative positions of the arm to limit the arm, according to its adjustment, to one of such positions, and means for confining the actuating-bar to substantially a straight-line travel.

21. In a switch-operating mechanism, the combination with an actuating-bar, of an actuating-arm having a mounting that is stationary in location, a rotating shaft, a crank-arm secured to the rotating shaft and having sliding connection with the actuating-bar, a V-cam located between operative positions of the arm to retain the arm, according to its adjustment, in one of such positions, and means for confining the actuating-bar to substantially a straight-line travel.

22. In a switch-operating mechanism, the combination with an actuating-bar, of an actuating-arm for operating the same, a rotating shaft, a crank-arm secured to the rotating shaft and having sliding connection with the actuating-bar, a mechanical obstruction interposed between operative positions of the arm for causing the actuating-arm with the actuating-bar to retain an operative position, and means for confining the actuating-bar to substantially a straight-line travel.

23. A lock, comprising a reciprocating member $l$, having a recess $v$, a cam $x$ provided with a nose $w$, and a lug $y$ upon which the said cam is pivoted, the cam being provided with an aperture *x*, while the lug is provided with a corresponding catch, whereby a locking-hasp may be passed through the said aperture to secure the nose of the cam in locking engagement with the reciprocating member.

24. In a switch-operating mechanism, the combination with an actuating-bar, of an actuating-arm, a cam in the form of an inverted V located between operative positions of the arm to limit the arm according to its adjustment to one of such positions, and a second cam for preventing material elevation of the actuating-arm above the aforesaid cam.

25. In a switch-operating mechanism, the combination with an actuating-bar, of means for confining the same to a straight-line travel, a rotating shaft, a crank-arm secured thereto having sliding connection with the actuating-bar, an actuating-arm having pivotal connection with the operating-shaft, and a cam interposed between alternative positions of the actuating-arm to cause the arm to elevate and lower in being swung from one position to another.

26. In a switch-operating mechanism, the combination with an actuating-bar, of an actuating-arm for operating the same, and a vertical stationary lug interposed between operative positions of the actuating-arm for retaining the actuating-arm with the actuating-bar in an operative position and to force vertical movement of the arm when moving the actuating-bar.

27. In a switch-operating mechanism, the combination with an actuating-bar, of an actuating-arm for operating the same, and a stationary vertically-projecting mechanical obstruction interposed between operative positions of the arm for causing the actuating-arm, with the actuating-bar, to retain an operative position and to force vertical movement of the arm when moving the actuating-bar.

28. In a switch-operating mechanism, the combination with an actuating-bar, of an actuating-arm for operating the same, a rotating shaft having engagement with the actuating-arm and actuating-bar, and a stationary vertically-projecting mechanical obstruction interposed between operative positions of the actuating-arm for causing the actuating-arm with the actuating-bar to retain an operative position and to force vertical movement of the arm when moving the actuating-bar.

29. In a switch-operating mechanism, the combination with an actuating-bar, of an actuating-arm for operating the same, a rotating shaft having engagement with the actuating-arm and actuating-bar, and a cam interposed between operative positions of the arm for causing the actuating-arm with the actuating-bar to retain an operative position.

30. In a switch-operating mechanism, the combination with an actuating-bar, of an actuating-arm for operating the same, a rotating shaft, a crank-arm secured to the rotating shaft and having connection with the actuating-bar, and a stationary mechanical obstruction interposed between operative positions of the actuating-arm for causing the actuating-arm with the actuating-bar to retain an operative position.

31. In a switch-operating mechanism, the combination with an actuating-bar, of an actuating-arm for operating the same, a rotating shaft, a crank-arm secured to the rotating shaft and having sliding connection with the actuating-bar, a stationary mechanical obstruction interposed between operative positions of the actuating-arm for causing the actuating-arm with the actuating-bar to retain an operative position, and means for confining the actuating-bar to substantially a straight-line travel.

32. In a switch-operating mechanism, the combination with an actuating-bar, of a rotating shaft, a crank-arm engaging the shaft with the bar, an actuating-arm having swinging connection with the rotating shaft, and a cam interposed between alternative positions of the actuating-arm to force the elevation of the actuating-arm and permit its depression as it is being swung from one position to another.

33. In a switch-operating mechanism, the combination with an actuating-bar, of a rotating shaft, a crank-arm engaging the shaft with the bar, an actuating-arm having swinging connection with the rotating shaft, and a lug interposed between alternative positions of the actuating-arm to force the elevation of the actuating-arm and permit its depression as it is being swung from one position to another.

34. In a switch-operating mechanism, the combination with an actuating-bar, of a rotating shaft for operating the bar, an actuating-arm having swinging connection with the rotating shaft, and a cam interposed between alternative positions of the actuating-arm to force the elevation of the actuating-arm and permit its depression as it is being swung from one position to another.

35. In a switch-operating mechanism, the combination with an actuating-bar, of a rotating shaft for operating the bar, an actuating-arm having swinging connection with the rotating shaft, and a lug interposed between alternative positions of the actuating-arm to force the elevation of the actuating-arm and permit its depression as it is being swung from one position to another.

GEORGE L. MANSFIELD.

Witnesses:
WALTER H. CHAMBERLIN,
C. C. CUNNINGHAM.